(12) United States Patent
Chen et al.

(10) Patent No.: US 7,816,839 B2
(45) Date of Patent: Oct. 19, 2010

(54) ULTRASONIC LINEAR MOTOR

(75) Inventors: Yi-Cheng Chen, Hsinchu (TW); Yu-Jen Wang, Hsinchu (TW); Chien Li, Hsinchu (TW); Chien-Shien Yeh, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 94 days.

(21) Appl. No.: 12/276,493

(22) Filed: Nov. 24, 2008

(65) Prior Publication Data
US 2010/0033057 A1 Feb. 11, 2010

(30) Foreign Application Priority Data
Aug. 7, 2008 (TW) ............... 97130000 A

(51) Int. Cl.
*H02N 2/00* (2006.01)
(52) U.S. Cl. ............. 310/323.09; 310/323.02; 310/323.04; 310/323.17
(58) Field of Classification Search ............... 310/323.01–323.06, 323.08, 323.09, 323.16, 310/323.17, 367, 368
See application file for complete search history.

(56) References Cited

U.S. PATENT DOCUMENTS

| | | | |
|---|---|---|---|
| 4,019,073 A * | 4/1977 | Vishnevsky et al. ......... | 310/322 |
| 4,453,103 A * | 6/1984 | Vishnevsky et al. ..... | 310/323.02 |
| 5,453,653 A | 9/1995 | Zumeris et al. | |
| 6,747,394 B2 | 6/2004 | Johansson et al. | |
| 6,765,335 B2 | 7/2004 | Wischnewskiy et al. | |
| 6,799,745 B2 * | 10/2004 | Schmauser et al. ..... | 251/129.06 |
| 7,053,525 B2 | 5/2006 | Funakubo et al. | |
| 7,105,987 B2 | 9/2006 | Witteveen et al. | |
| 7,205,703 B2 | 4/2007 | Funakubo et al. | |
| 7,518,286 B2 * | 4/2009 | Kojima et al. .......... | 310/323.01 |
| 2008/0073999 A1 | 3/2008 | Wischnewskij et al. | |
| 2008/0100715 A1* | 5/2008 | Chang et al. ............ | 348/208.7 |
| 2009/0009032 A1 * | 1/2009 | Wischnewskij et al. | 310/323.02 |

FOREIGN PATENT DOCUMENTS

WO WO 2007-045525 A1 * 4/2007

* cited by examiner

*Primary Examiner*—Thomas M Dougherty
(74) *Attorney, Agent, or Firm*—Rabin & Berdo, P.C.

(57) ABSTRACT

An ultrasonic linear motor includes a substrate; a vibrator disposed on the substrate having an oblique or curved face at two sides thereof forming concave receiving portions with the surfaces of the substrate; and a slider having clamping portions at two sides thereof for correspondingly clamping to the receiving portions, wherein the vibrator is for generating a driving force to the slider while connecting with a power supply, such that the clamping portions of the slider move within the receiving portions, thereby generating a linear translation. The present invention adopts a simple structure having few elements that enables easy manufacturing and integration with other elements, thus reducing manufacturing cost.

13 Claims, 13 Drawing Sheets

ULTRASONIC LINEAR MOTOR

FIELD OF THE INVENTION

The present invention relates to an ultrasonic linear motor, and more particularly, to an ultrasonic linear motor that has a simple structure and only a few elements.

BACKGROUND OF THE INVENTION

Compared to traditional electromagnetic type motors, ultrasonic motors have various advantages, such as fast response, high precision, independence to electromagnetic interference, no complicated coil structure. Due to the linear driving characteristic of the ultrasonic linear motors, bulk and complicated screw conversion mechanism and power consumption during motion conversion can be eliminated. In addition, ultrasonic motors is self-locking when no power is applied, this saves energy when stationary, unlike the traditional electromagnetic type motors. Therefore, ultrasonic motors have gradually took over the place of electromagnetic motors and been widely used in producing micro-driving elements, such as in the driving element of a camera lens.

The driving mechanism of a typical ultrasonic linear motor uses vibrations generated on a surface of a vibrator in the motor to actuate a slider to rotate or linearly translate. Commercially available ultrasonic linear motor can generally be classified into two types: stepper type and resonant type. The former one performs stepping movement in units of a few nanometers, whereas the latter one operates under a resonant condition of the vibrator and drives the slider using resonant waves. Both have their benefits, the former one has high positioning resolution, while the latter one has high efficiency and high motion speed due to the resonant condition. Stepper type ultrasonic linear motors are mostly used for nano-scale positioning in laboratories or semiconductor manufacturing processes. On the other hand, resonant type ultrasonic linear motors are highly efficient and simple to drive, they are especially suitable for consumer electronic products, such as miniaturized (photo or video) cameras with the ability to avoid handshaking and/or enable optical zooming, or for highly secure automatic electronic locks that are immune to electromagnetic interference.

However, one problem currently encountered in designing ultrasonic linear motors is that the shapes of the ceramic vibrators cannot be easily manufactured, since ceramic is a fragile material. If the shape of the vibrator is complicated, it cannot be molded in a single run, and subsequent cutting processes can be difficult (referring to U.S. Pat. Nos. 7,105,987, 7,053,525 and 7,205,703). Furthermore, the amount of accompanying elements can be numerous (referring to U.S. Pat. Nos. 5,453,653, 6,765,335 and US Publication no. 2008/073,999, all of which require additional bearing members, or referring to U.S. Pat. No. 6,747,394, which uses two vibrators and the performance of such motor may be affected since the dynamic characteristics of these two vibrators might be slightly different), and structures are more complicated. Accordingly, assembly precision is critical for these types of motors, such that they cannot be manufactured at a low cost. Furthermore, if the fixing structure of the vibrator is not well designed, it may suppress vibrator oscillation during operation.

Thus, there is a need for an ultrasonic linear motor that has few elements, a simple structure and can be easy to manufacture and integrate with other elements, thereby reducing manufacturing cost and requirements of high assembly precision.

SUMMARY OF THE INVENTION

In the light of forgoing drawbacks, an objective of the present invention is to provide an ultrasonic linear motor that has few elements, a simple structure and can be easy to manufacture and integrate with other elements, thereby reducing manufacturing cost and requirements of high assembly precision.

Another objective of the present invention is to provide an ultrasonic linear motor that allows the vibrator oscillation to be fully exploited.

In accordance with the above and other objectives, the present invention provides an ultrasonic linear motor includes a substrate; a vibrator disposed on the substrate having an oblique or curved face at two sides thereof forming concave receiving portions with the surfaces of the substrate; and a slider having clamping portions at two sides thereof for correspondingly clamping to the receiving portions, wherein the vibrator is for generating a driving force to the slider while connecting with a power supply, such that the clamping portions of the slider move within the receiving portions, thereby generating a linear translation.

In a preferred embodiment of the present invention, the substrate and the vibrator are partially fixed to each other via at least one block or at least one protrusion of the substrate fixed with the vibrator or at least one protrusion of the vibrator fixed with the substrate. The receiving portions are L-shaped concave structures, and their surface can be of planar or arbitrary curved shapes. The surfaces of the clamping portions of the slider in contact with the receiving portions are of planar or arbitrary curved shapes. The substrate and the vibrator include a planar (or curved) plate (or slab). The vibrator is made of a piezoelectric material. The power supply provides an oscillating voltage with vibrator's resonant frequency. A first electrode and a second electrode are disposed adjacent to each other on the surface of the vibrator facing the substrate, while a ground electrode is disposed on the surface of the vibrator facing the slider, either the first electrode or the second electrode and the ground electrode are used for connecting with the power supply. Alternatively, a ground electrode is disposed on the surface of the vibrator facing the substrate, while a first electrode and a second electrode are disposed adjacent to each other on the surface of the vibrator facing the slider, either the first electrode or the second electrode and the ground electrode are used for connecting with the power supply.

In accordance with the above and other objectives, the present invention provides an ultrasonic linear motor, comprising: a substrate; a vibrator disposed on the substrate having an oblique or curved face at two sides thereof; and a slider having clamping portions at two sides thereof for correspondingly clamping to the two side faces of the vibrator and substrate surface, wherein the vibrator is for generating a driving force to the slider while connecting with a power supply, such that the clamping portions of the slider slides with respect to the two side surfaces of the vibrator or with respect to the substrate surface, thereby generating a linear translation.

In a preferred embodiment of the present invention, the substrate and the vibrator are partially fixed to each other via at least one block or at least one protrusion of the substrate fixed with the vibrator or at least one protrusion of the vibrator fixed with the substrate. The surfaces of the substrate can be of planar or arbitrary curved shapes. The surfaces of the clamping portions of the slider are of planar or arbitrary curved shapes. The substrate and the vibrator include a planar (or curved) plate (or slab). The vibrator is made of a piezoelectric material. The power supply provides an alternating voltage with vibrator's resonant frequency. A first electrode and a second electrode are disposed adjacent to each other on the surface of the vibrator facing the substrate, while a ground electrode is disposed on the surface of the vibrator facing the slider, either the first electrode or the second electrode and the ground electrode are used for connecting with the power supply. Alternatively, a ground electrode is disposed on the surface of the vibrator facing the substrate, while a first electrode and a second electrode are disposed adjacent to each other on the surface of the vibrator facing the slider, either the first electrode or the second electrode and the ground electrode are used for connecting with the power supply.

In summary, the ultrasonic linear motor disclosed by the present invention adopts a simple structure comprising a substrate, a vibrator and a slider for easy manufacturing and integration with other elements. In particular, the surfaces of the two sides of the vibrator are oblique, which is easy to manufacture and can be molded into a trapezoid cross-section structure in a single process without the need for a subsequent cutting process, thereby reducing manufacturing cost and requirements for high assembly precision. In addition, the substrate and the vibrator are only partially fixed to each other via the aforementioned protrusion or block, thus the vibrator oscillation can be fully exploited.

BRIEF DESCRIPTION OF THE DRAWINGS

The present invention can be more fully understood by reading the following detailed description of the preferred embodiments, with reference to the accompanying drawings, wherein.

DETAILED DESCRIPTION OF THE EMBODIMENTS

The present invention is described by the following specific embodiments. Those with ordinary skills in the arts can readily understand the other advantages and functions of the present invention after reading the disclosure of this specification. The present invention can also be implemented with different embodiments. Various details described in this specification can be modified based on different viewpoints and applications without departing from the scope of the present invention.

Figure 1:
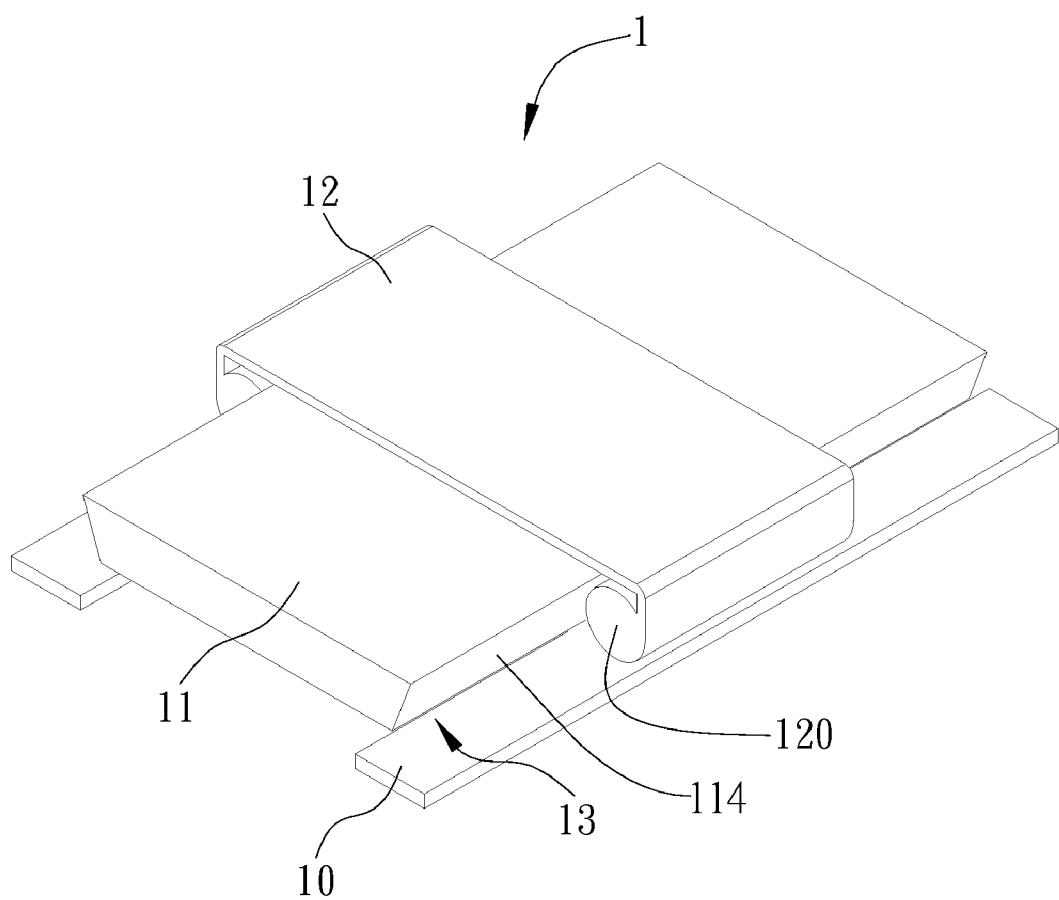
FIG. 1 is a three-dimensional view depicting an ultrasonic linear motor according to an embodiment of the present invention.
Figure 2:
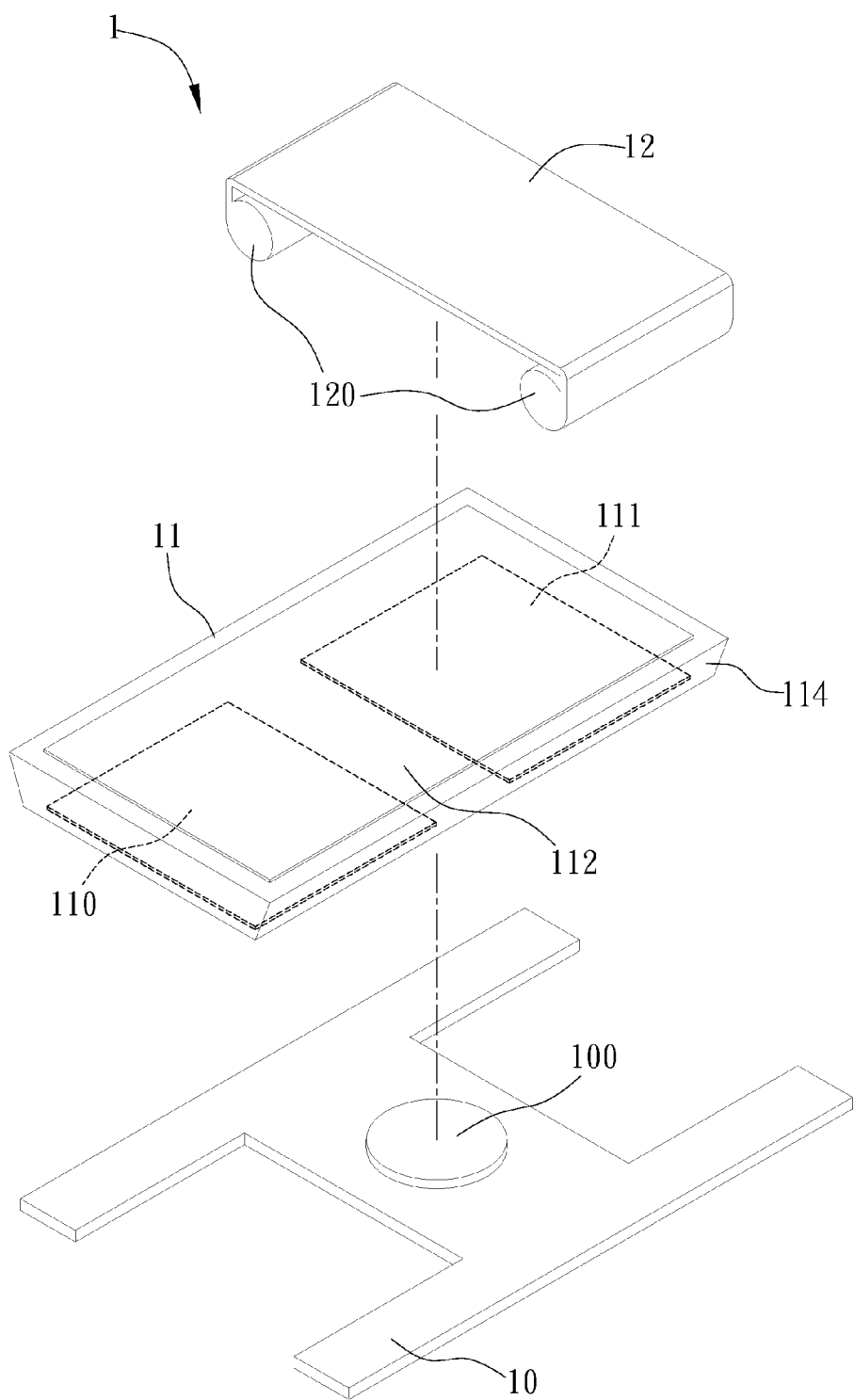
FIG. 2 is a three-dimensional exploded view depicting an ultrasonic linear motor according to an embodiment of the present invention.
Figure 3:
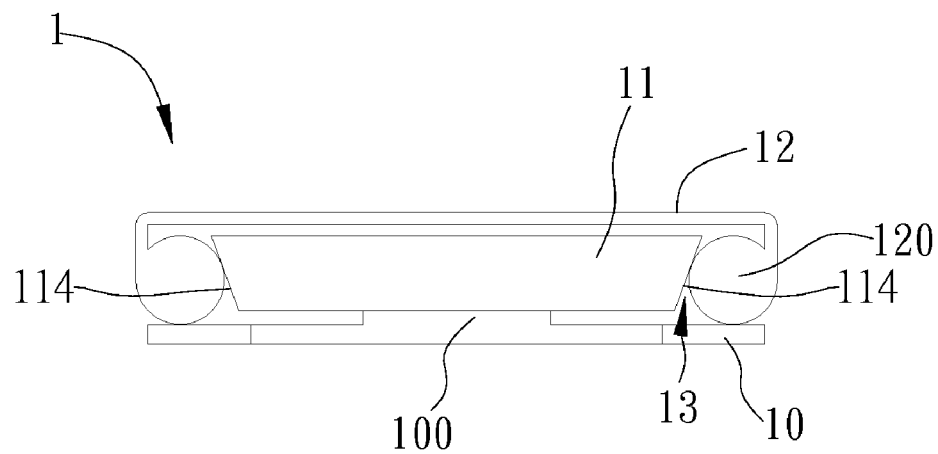
FIG. 3 is a schematic cross-sectional view depicting an ultrasonic linear motor according to an embodiment of the present invention.

Referring to FIGS. 1, 2 and 3, a three-dimensional view, an exploded view and a cross-section view of an ultrasonic linear motor according to one embodiment of the present invention are shown, respectively. The ultrasonic linear motor 1 includes a substrate 10, a vibrator 11 and a slider 12, which are described in details as follow.

Figure 4:
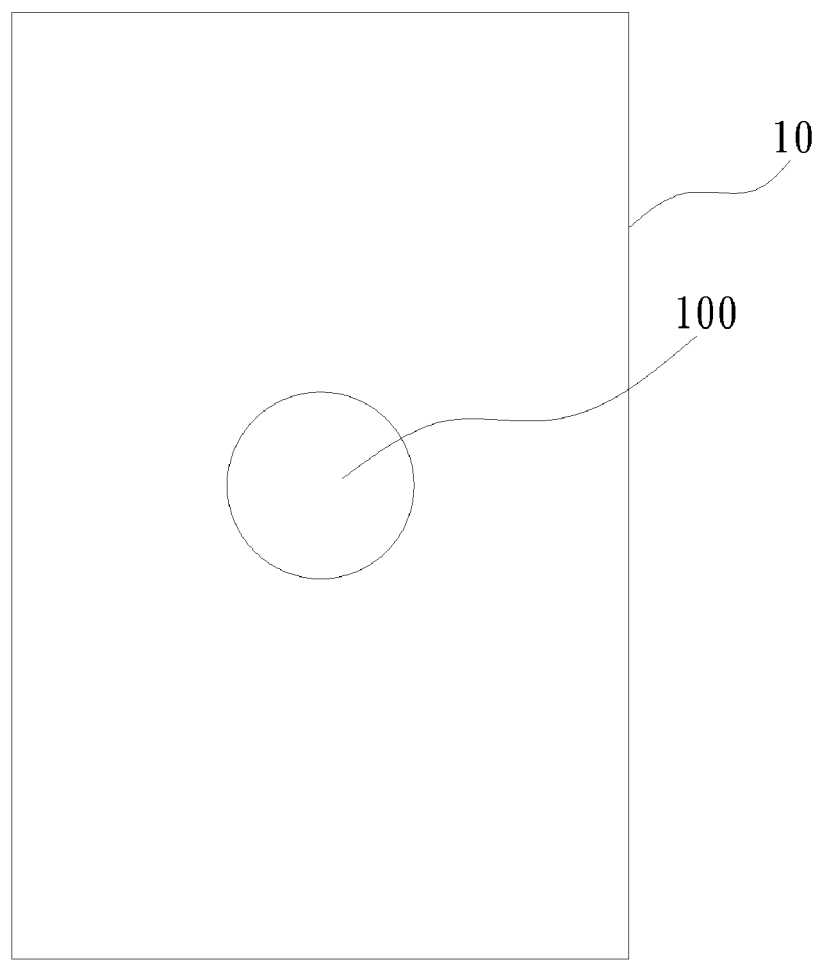
FIG. 4 is a schematic view depicting a substrate of an ultrasonic linear motor according to another embodiment of the present invention.

In this embodiment, the substrate 10 is an H-shaped slab or shell having a protrusion disposed on the center thereof. It should be noted that, in actual implementations, the shape of the substrate 10, the shape, size, location and quantity of the protrusion 100 are not limited to those illustrated in this embodiment. The shape of the substrate 10 can be rectangular (as shown in FIG. 4) or any other shapes. The purpose of this H shape of the substrate presented in this embodiment will be made clear later on.

Figure 5:
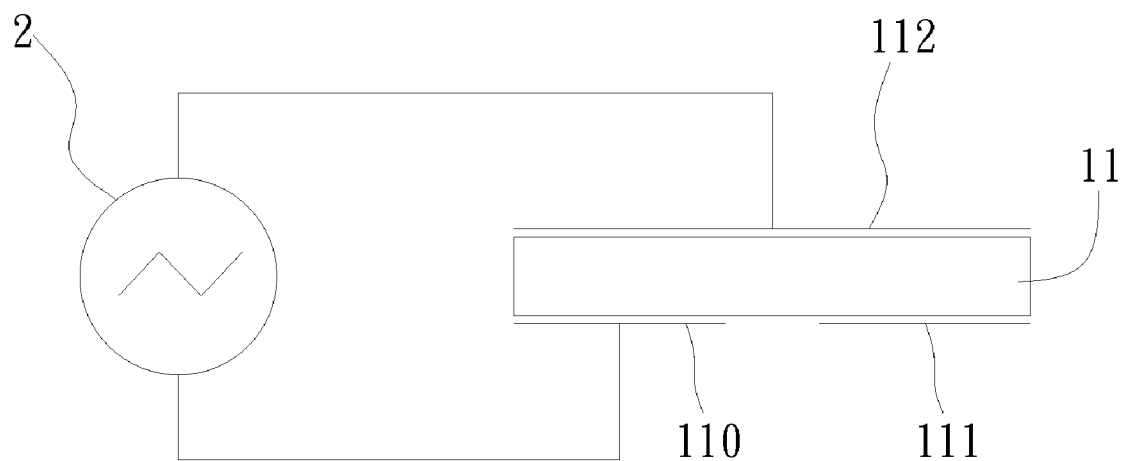
FIG. 5 is a schematic circuit diagram depicting a vibrator of an ultrasonic linear motor connecting to a power supply according to an embodiment of the present invention.
Figure 6A:
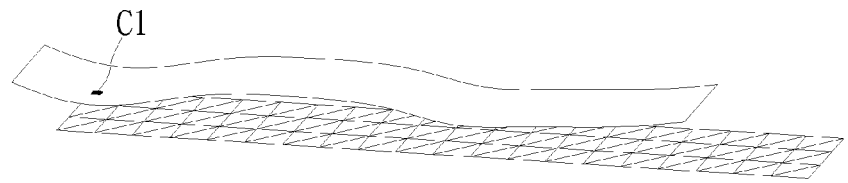
FIGS. 6(A) to 6(D) are schematic diagrams illustrating waves following an elliptical trajectory when a vibrator of an ultrasonic linear motor is connected to a power supply according to an embodiment of the present invention.
Figure 6B:
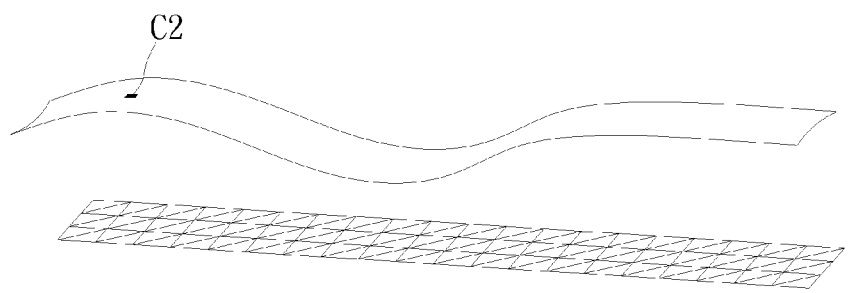
Figure 6C:
Figure 6D:
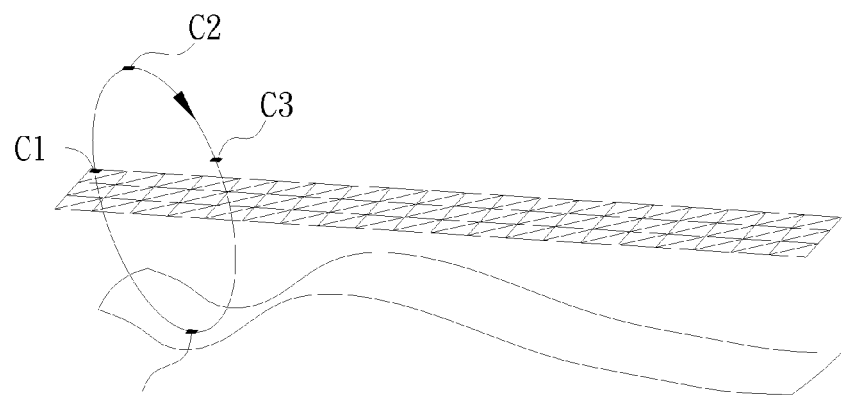

The vibrator 11 is disposed on the substrate 10. Oblique faces 114 at two sides of the vibrator 11 form concaving receiving portions 13 with the surfaces of the substrate 10 for generating driving force while connecting with a power supply. In this embodiment, the vibrator can be a planar (or curved) plate (or slab) made of a piezoelectric material. In addition, the power supply provides an oscillating voltage with vibrator's resonant frequency. A first electrode 110 and a second electrode 120 adjacent to each other are provided on the surface of the vibrator facing the substrate 10. A ground electrode 112 is provided on the surface of the vibrator facing the slider 12. Either the first electrode 110 or second electrode 111 and the ground electrode 112 are connected to the power supply, producing waves following an elliptical trajectory (i.e. the driving force). As shown in FIG. 5, when the first electrode 110 and the ground electrode 112 of the vibrator are connected with the power supply 2, the vibrator 11 will generate waves following an elliptical trajectory as shown in FIGS. 6(A) to 6(D). Small rectangles C1, C2, C3 and C4 represent the same spot on the vibrator 1 at different time points (only four specific time points are sampled), respectively. It can be shown from this position variation that when the vibrator 11 is connected to the power supply 2, waves following an elliptical trajectory shown by the arrow in FIG. 6(D) can be generated. Of course, the traveling trajectory of the driving force is not limited to that depicted in this embodiment, but can be a back and forth linear trajectory or other types of trajectories. Moreover, in other embodiments (not shown), the ground electrode 12 can also be disposed on the surface of the vibrator 11 facing the substrate 10, and correspondingly, the adjacent first and second electrodes 110 and 111 can be disposed on the surface of the vibrator 11 facing the slider 12.

Figure 7A:
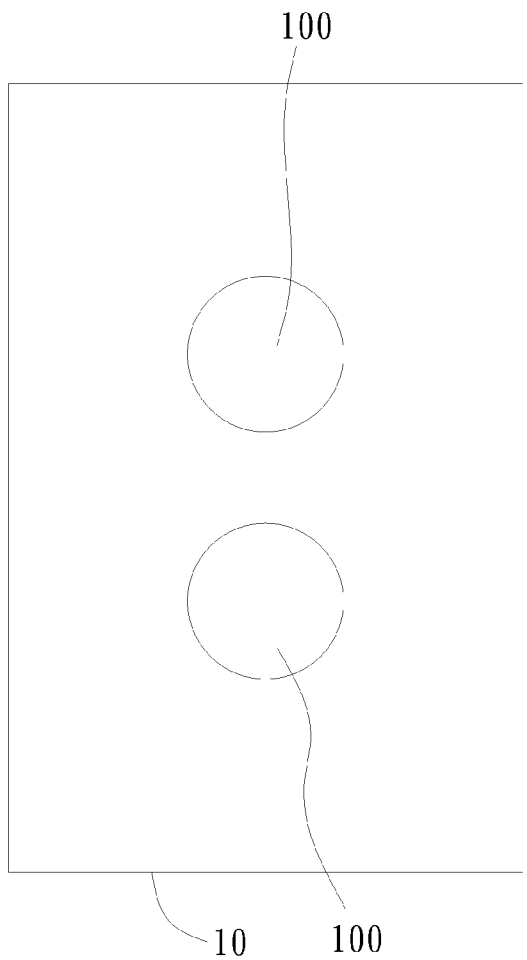
FIGS. 7(A) and 7(B) are schematic diagrams illustrating variations of protrusions on a substrate of an ultrasonic linear motor according to other embodiments of the present invention.
Figure 7B:
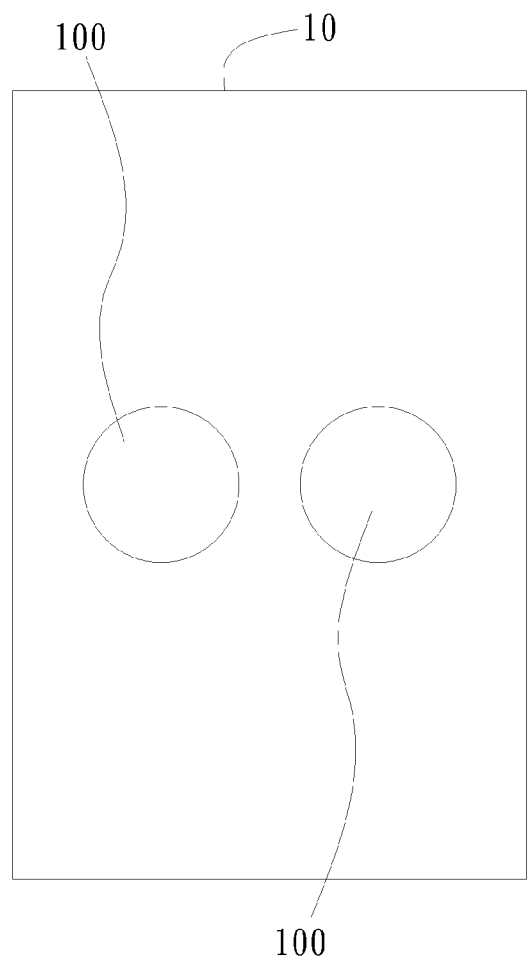

It should be further noted that, to accommodate the first and second electrodes 110 and 111 disposed on the surface of the vibrator 11 facing the substrate 10, the substrate 10 is designed to have an "H" shape for exposing the first and second electrodes 110 and 111, so that they can be connected to the power lines. If the shape of the substrate 10 used is rectangular (as shown in FIGS. 4, 7(A) and 7(B)), small holes should be made on the substrate 10 at suitable places to allow power lines to pass through to the first electrode 110 or the second electrode 111.

Additionally, the vibrator 11 and the substrate 10 are only partially fixed to each other, that is, via the protrusion 100 of the substrate 10 and the corresponding bottom portion of the vibrator 11. By making the contact area between the substrate 10 and the vibrator 11 smaller, when the vibrator 11 is powered, the impact of the substrate 10 on the vibrator 11 is reduced, so a highly efficient driving force can be generated. The protrusion 100 of the substrate 10 contacting a portion of the vibrator 11 can be made of any arbitrary shapes. It should be noted that, as shown in FIGS. 7(A) and 7(B), there can be a plurality of protrusions 100 on the substrate 10. Obviously, the shape of the substrate 10 and the locations of the first and second electrodes 110 and 111 (not shown in FIGS. 7(A) and 7(B)) will need to be modified according to the shape, size, quantity and location of the protrusion 100 of the substrate 10.

Figure 8A:
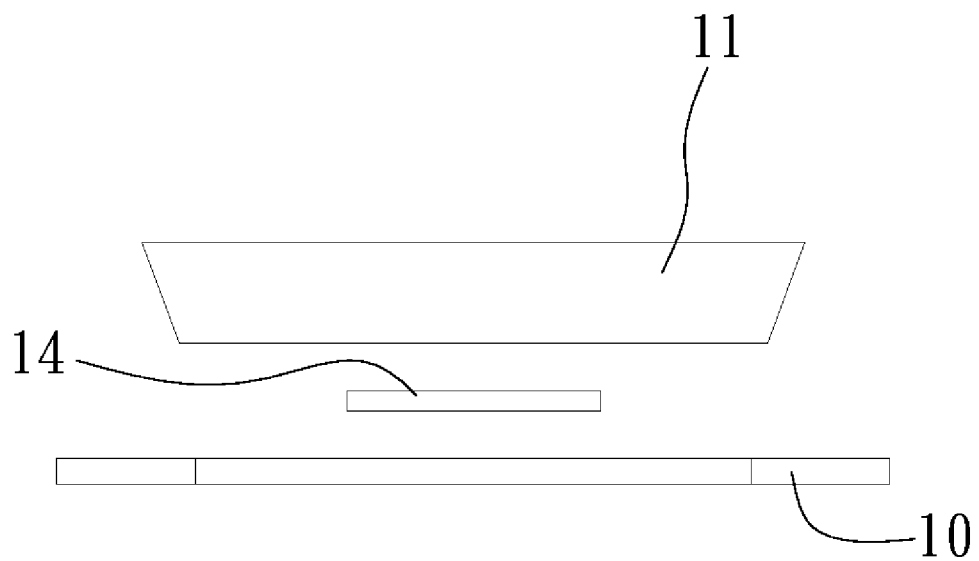
FIGS. 8(A) and 8(B) are schematic diagrams illustrating various ways of fixing a substrate and a vibrator in an ultrasonic linear motor according to embodiments of the present invention.
Figure 8B:
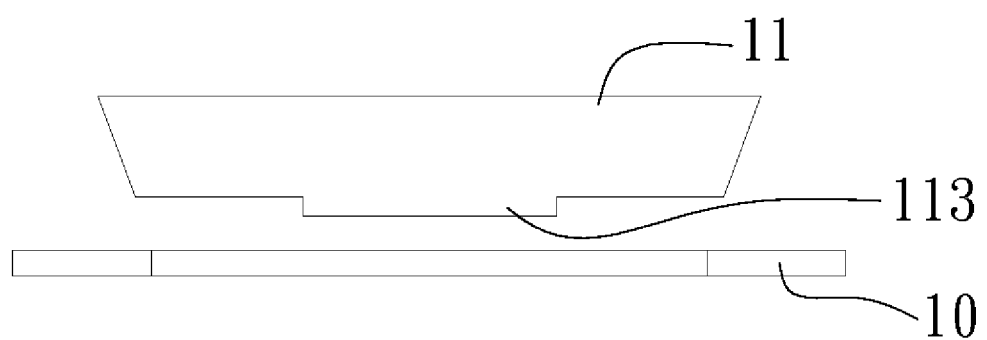
Figure 9A:
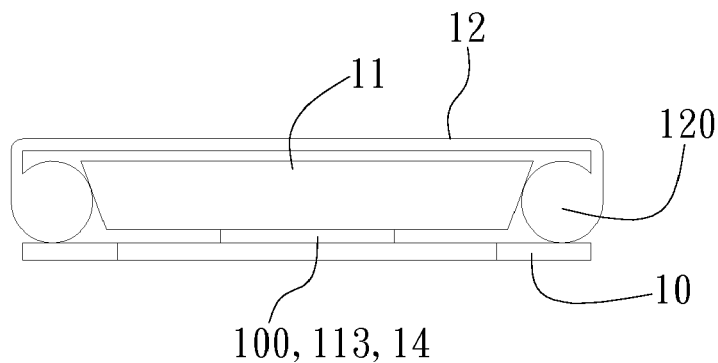
FIGS. 9(A) to 9(C) are schematic diagrams illustrating various shapes of protrusion(s) or block(s) of an ultrasonic linear motor according to embodiments of the present invention.
Figure 9B:
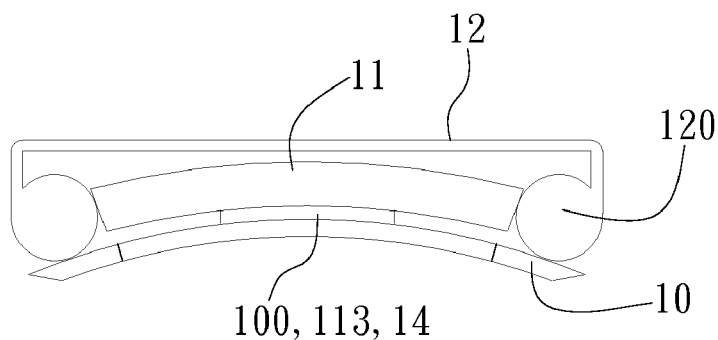
Figure 9C:
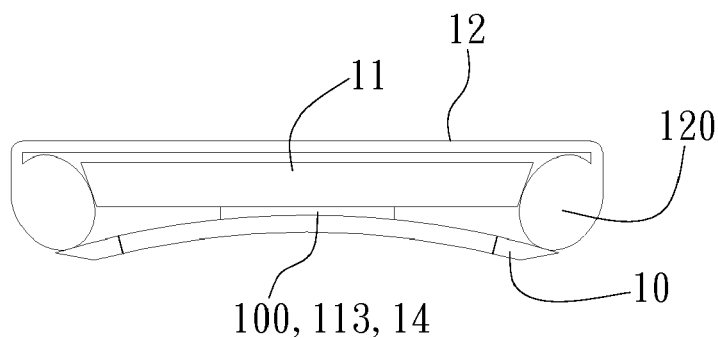

In other embodiments, as shown in FIG. 8(A), a block 14 can be provided between the substrate 10 and the vibrator 11. Alternatively, as shown in FIG. 8(B), a protrusion 113 is provided underneath the vibrator 11 for contacting the substrate 10. In all of the above embodiments, the block 14, the protrusion 100 or protrusion 113 partially attached to the vibrator 11 or the substrate 10 can be of any arbitrary shapes.

Figure 10A:
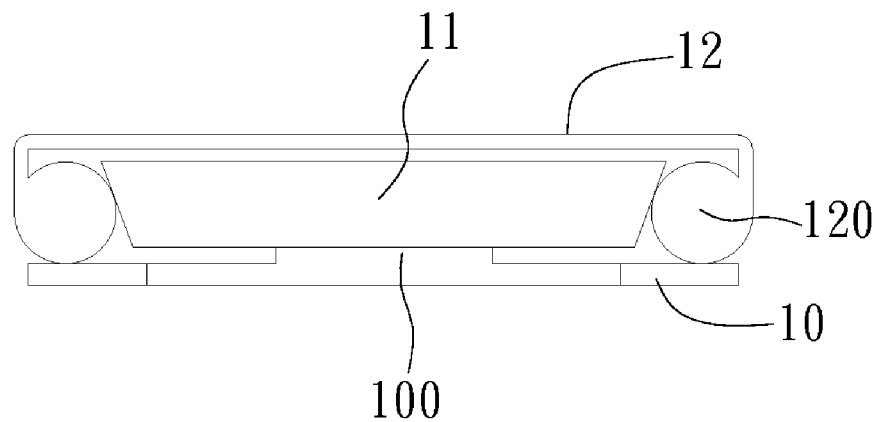
FIGS. 10(A) and 10(B) are schematic diagrams illustrating substrate surfaces in an ultrasonic linear motor according to embodiments of the present invention.
Figure 10B:
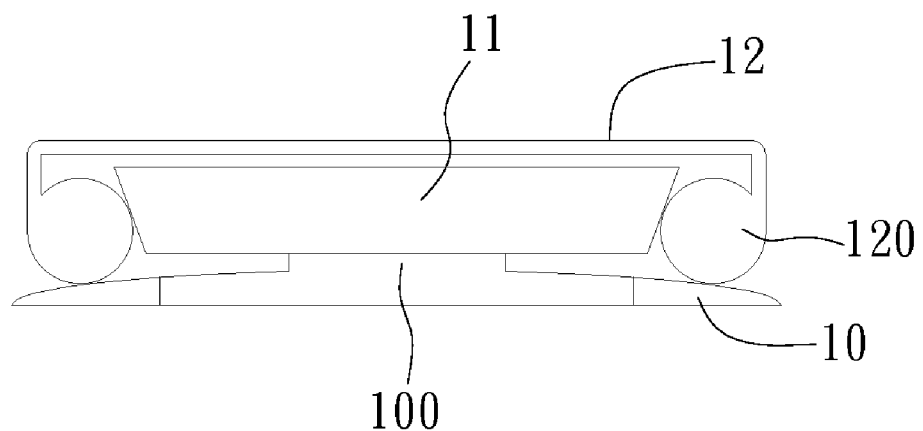
Figure 11A:
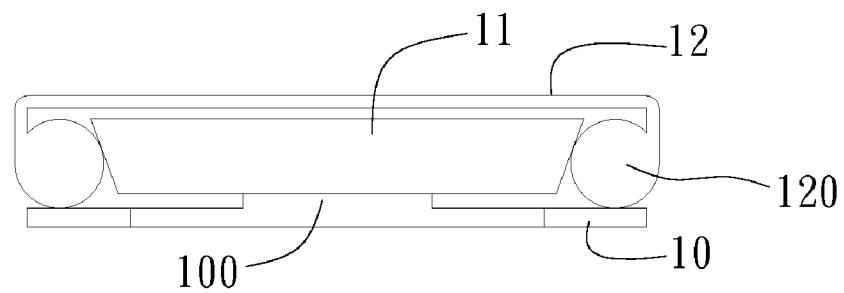
FIGS. 11(A) to 11(C) are schematic diagrams illustrating two side surfaces of a vibrator in an ultrasonic linear motor according to embodiments of the present invention.
Figure 11B:
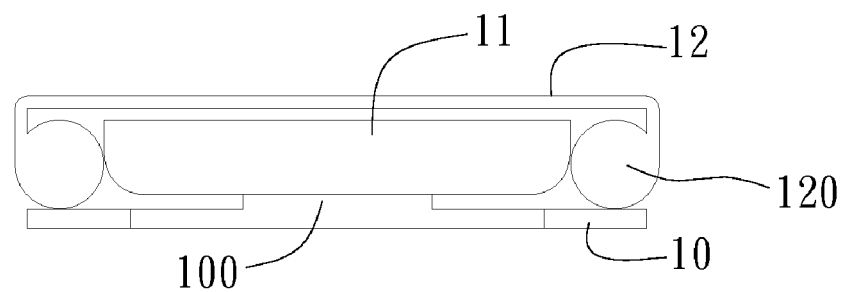
Figure 11C:
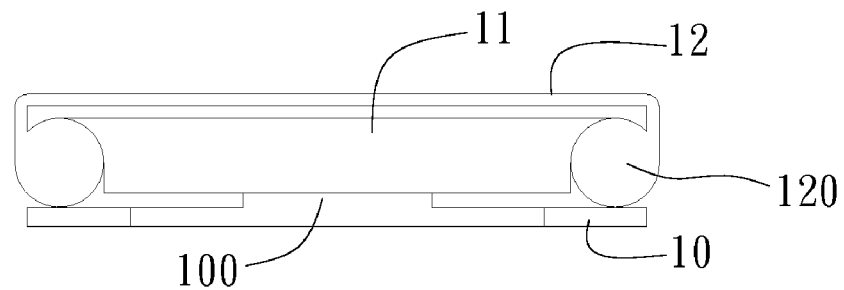

Moreover, in this embodiment, the receiving portions 13 are L-shaped concave structures, wherein the L-shaped concave structure is the acute angle (less than 90 degrees) between the two sides of the vibrator 11 and the substrate 10. Of course, in other embodiments, the angle can be larger than 90 degrees, as shown in FIGS. 10(A) and 10(B). The surfaces of the substrate 10 forming the receiving portions 13 can be planar or arbitrary curved surfaces, as shown in FIG. 11(A) to 11(C). The surfaces of the two sides of the vibrator 11 forming the receiving portions 13 can be a oblique or arbitrary curved surfaces. Obviously, if the surfaces of the substrate 10 forming the receiving portions 13 are arbitrary curved surfaces or the surfaces of the two sides of the vibrator 11 forming the receiving portions 13 are arbitrary curved surfaces, the angle between the sides of the vibrator 11 and the substrate 10 is determined from the angle made by the tangents where the slider 12 contacts respectively with the substrate 10 and the vibrator 11.

Figure 12A:
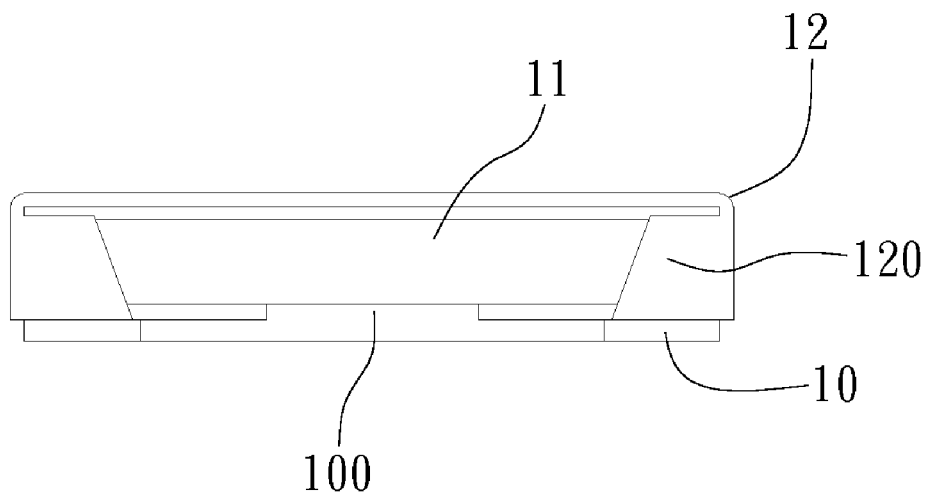
FIGS. 12(A) and 12(B) are schematic diagrams illustrating surfaces of clamping portions of a slider in an ultrasonic linear motor according to embodiments of the present invention.
Figure 12B:
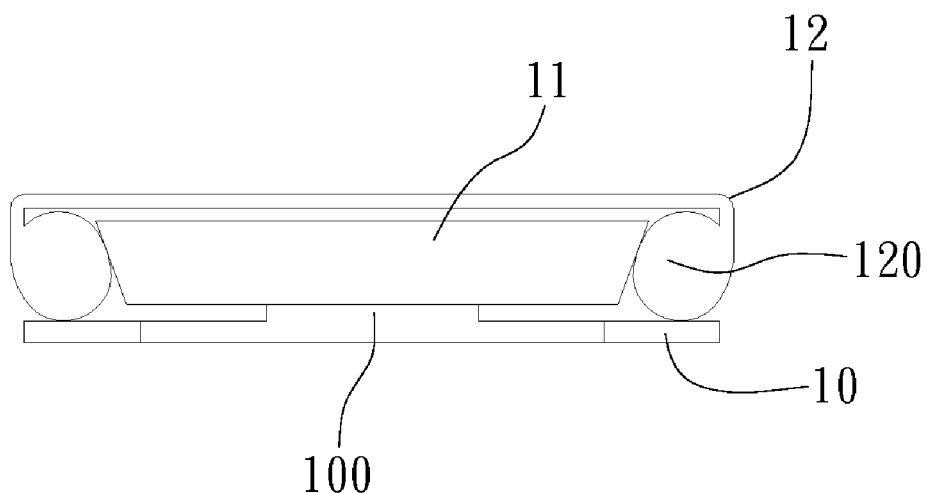

The slider 12 includes clamping portions 120 on two sides thereof for clamping at the receiving portions 13 and receiving the driving force generated from the vibrator 11 and generating linear translation. In this embodiment, as shown in FIG. 12(A) or 12(B), the surfaces of the clamping portions 120 of the slider 12 in contact with the receiving portions 13 are planar or arbitrary curved surfaces.

Figure 13A:
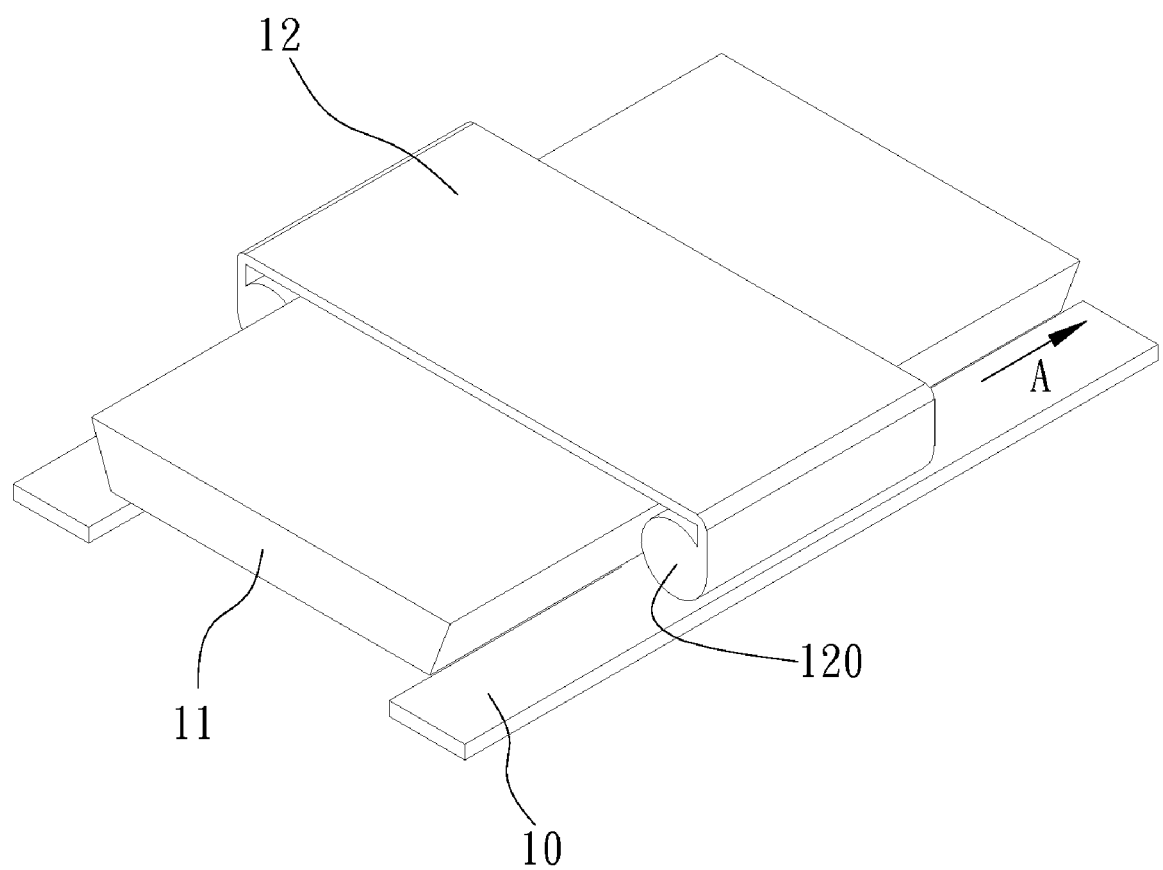
FIGS. 13(A) and 13(B) are schematic diagrams illustrating actuations of an ultrasonic linear motor according to the present invention.
Figure 13B:
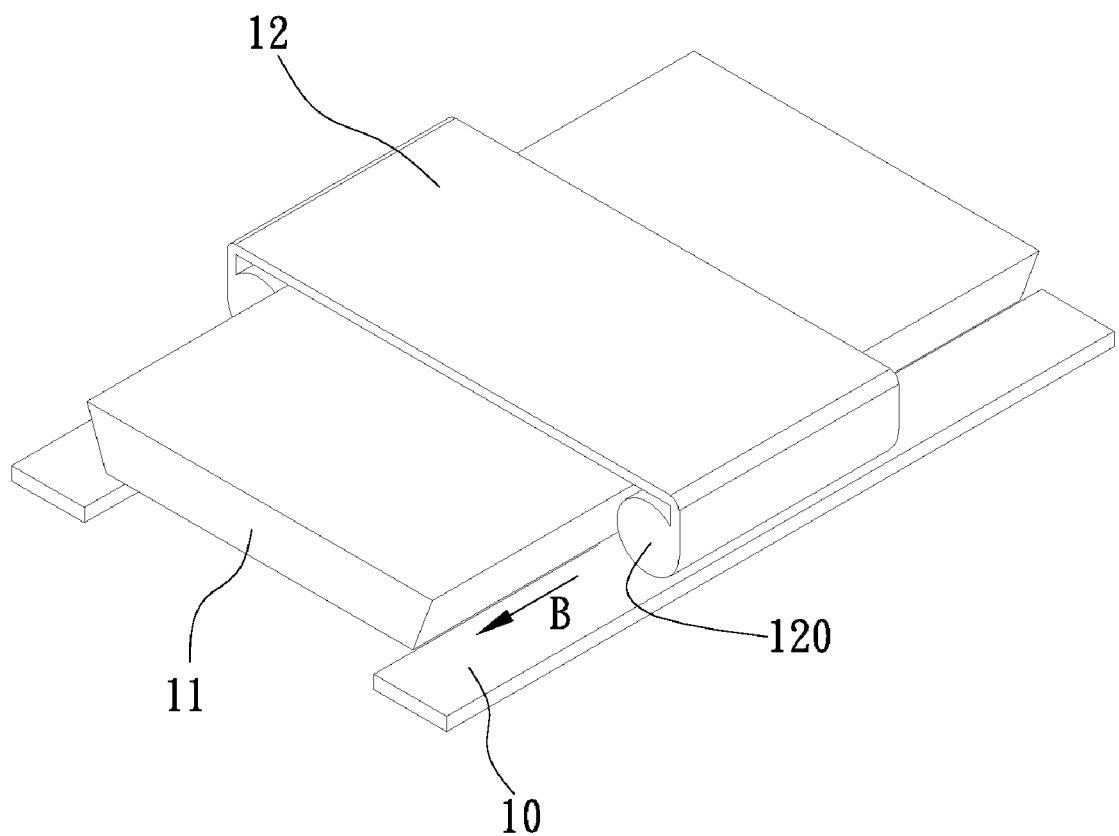

Referring to FIGS. 13(A) and 13(B), the actuating mechanism of the ultrasonic linear motor 1 according to embodiments of the present invention are explained in details.

As shown in FIG. 13(A), when an oscillating voltage with vibrator's 11 resonant frequency is applied to the first electrode 110 and the ground electrode 112 of the vibrator 11, the surface of the vibrator 11 oscillates and produces waves following an elliptical trajectory, which then actuates the slider 12, so that it linearly moves in a direction indicated by an arrow A shown. On the contrary, as shown in FIG. 13(B), when an oscillating voltage with vibrator's 11 resonant frequency is applied to the second electrode 11 and the ground electrode 112 of the vibrator 11, the surface of the vibrator 11 oscillates and produces waves following an elliptical trajectory, which then actuates the slider 12, so that it linearly moves in a direction indicated by an arrow B shown. Thus, in actual implementations, the voltage can be applied to the first electrode 110 and the ground electrode 112 or the second electrode 111 and the ground electrode 112 at different times to obtain a back-and-forth linear translation of the slider 12, thereby achieving the linear motion of the ultrasonic linear motor.

In summary, the ultrasonic linear motor disclosed by the present invention adopts a simple structure comprising a substrate, a vibrator and a slider for easy manufacturing and integration with other elements. In particular, the surfaces of the two sides of the vibrator are oblique, which is easy to manufacture and can be molded into a trapezoid cross-section structure in a single process without the need for a subsequent cutting process, thereby reducing manufacturing cost and requirements for high assembly precision. In addition, the substrate and the vibrator are only partially fixed to each other via the aforementioned protrusion or block, thus the oscillation can be fully exploited.

The above embodiments are only used to illustrate the principles of the present invention, and they should not be construed as to limit the present invention in any way. The above embodiments can be modified by those with ordinary skills in the arts without departing from the scope of the present invention as defined in the following appended claims.

What is claimed is:

1. An ultrasonic linear motor, comprising:
 a substrate;
 a vibrator disposed on the substrate and having an oblique or curved face at two sides thereof forming concave receiving portions with the surfaces of the substrate; and
 a slider having clamping portions at two sides thereof for correspondingly clamping to the receiving portions,
 wherein the vibrator is for generating a driving force to the slider while connecting with a power supply, such that the clamping portions of the slider move within the receiving portions, thereby generating a linear translation.

2. The ultrasonic linear motor of claim 1, wherein a portion of the vibrator is fixed to a corresponding portion of the substrate.

3. The ultrasonic linear motor of claim 2, further comprising at least one block in contact with the portion of the vibrator and the corresponding portion of the substrate for fixing the vibrator to the substrate.

4. The ultrasonic linear motor of claim 2, wherein the substrate includes at least one protrusion for fixing with the vibrator and being in contact with the portion of the vibrator.

5. The ultrasonic linear motor of claim 2, wherein the vibrator includes at least one protrusion for fixing with the substrate and being in contact with the corresponding portion of the substrate.

6. The ultrasonic linear motor of claim 1, wherein the receiving portions are L-shaped concave structures and angles formed between the respective sides of the vibrator and the substrate.

7. The ultrasonic linear motor of claim 1, wherein the surfaces of the substrate forming the receiving portions are planar surfaces.

8. The ultrasonic linear motor of claim 1, wherein the surfaces of the clamping portions of the slider in contact with the receiving portions are planar surfaces.

9. The ultrasonic linear motor of claim 1, wherein the substrate and the vibrator includes a planar (or curved) plane (or slab).

10. The ultrasonic linear motor of claim 1, wherein the vibrator is made of a piezoelectric material.

11. The ultrasonic linear motor of claim 1, wherein the power supply provides an oscillating voltage with vibrator's resonant frequency.

12. The ultrasonic linear motor of claim 11, wherein a first electrode and a second electrode are disposed adjacent to each other on the surface of the vibrator and facing the substrate, while a ground electrode is disposed on the surface of the vibrator and facing the slider, either the first electrode or the second electrode and the ground electrode are used for connecting with the power supply.

13. The ultrasonic linear motor of claim 11, wherein a ground electrode is disposed on the surface of the vibrator and facing the substrate, while a first electrode and a second electrode are disposed adjacent to each other on the surface of the vibrator and facing the slider, either the first electrode or the second electrode and the ground electrode are used for connecting with the power supply.

* * * * *